(12) United States Patent
Wong et al.

(10) Patent No.: US 7,399,956 B2
(45) Date of Patent: Jul. 15, 2008

(54) OPTICAL ENCODER WITH SINUSOIDAL PHOTODETECTOR OUTPUT SIGNAL

(75) Inventors: Weng Fei Wong, Penang (MY); Chee Foo Lum, Penang (MY); Siang Leong Foo, Penang (MY); Song Wah Ooi, Penang (MY); Keen Hun Leong, Penang (MY); Yik Foong Soo, Penang (MY); Sai Hong Hung, Penang (MY); Gin Ghee Tan, Penang (MY)

(73) Assignee: Avago Technologies ECBUIP Pte Ltd, Singapore (SG)

( * ) Notice: Subject to any disclaimer, the term of this patent is extended or adjusted under 35 U.S.C. 154(b) by 0 days.

(21) Appl. No.: 11/287,947

(22) Filed: Nov. 28, 2005

(65) Prior Publication Data

US 2007/0120049 A1  May 31, 2007

(51) Int. Cl.
*G01D 5/34* (2006.01)
(52) U.S. Cl. ............................. 250/231.14; 250/231.16; 250/231.17
(58) Field of Classification Search ................................ 250/231.13–231.18
See application file for complete search history.

(56) References Cited

U.S. PATENT DOCUMENTS

| | | | | |
|---|---|---|---|---|
| 3,441,350 A | | 4/1969 | Rantsch et al. | |
| 4,465,373 A | * | 8/1984 | Tamaki et al. | 356/617 |
| 5,017,776 A | * | 5/1991 | Loewen | 250/231.14 |
| 6,794,637 B1 | * | 9/2004 | Holzapfel | 250/231.13 |
| 2002/0008195 A1 | * | 1/2002 | Aoki et al. | 250/231.14 |
| 2004/0135076 A1 | * | 7/2004 | Martenson | 250/231.13 |
| 2004/0218190 A1 | | 11/2004 | Holzapfel | |
| 2006/0043274 A1 | | 3/2006 | Tovar | |
| 2006/0118707 A1 | * | 6/2006 | Schaake | 250/231.13 |
| 2007/0001107 A1 | | 1/2007 | Sannomiya et al. | |

FOREIGN PATENT DOCUMENTS

| | | |
|---|---|---|
| DE | 1673987 | 8/1971 |
| DE | 3305921 | 9/1983 |
| GB | 1227942 | 4/1971 |
| GB | 2116313 A | 9/1983 |
| WO | WO 03/038736 A2 | 5/2003 |

* cited by examiner

*Primary Examiner*—Georgia Y. Epps
*Assistant Examiner*—Tony Ko

(57) ABSTRACT

An optical encoder includes an optical encoder pattern of alternating light elements and dark elements, and an optical unit, including an optical emitter providing light to the encoder pattern, and an optical sensor including a photo-detector receiving the light from the optical encoder pattern and in response thereto outputting a sinusoidal signal indicating relative movement between the optical sensor and the encoder pattern. In one embodiment, the photo-detector has a diamond shape, a modified-diamond shape, or an hourglass shape. In another embodiment, at least one of the light elements and the dark elements of the optical encoder pattern has a diamond shape, a modified-diamond shape, or an hourglass shape.

19 Claims, 9 Drawing Sheets

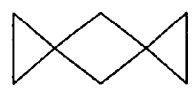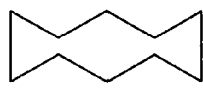
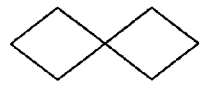 FIG. 3  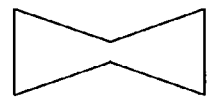 FIG. 5
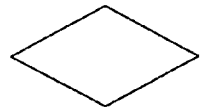 FIG. 4 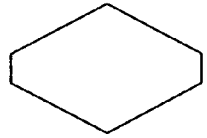

OPTICAL ENCODER WITH SINUSOIDAL PHOTODETECTOR OUTPUT SIGNAL

BACKGROUND

Optical encoders are used in a wide variety of contexts to determine movement and/or a position of an object with respect to some reference. Optical encoding is often used in mechanical systems as an inexpensive and reliable way to measure and track motion among moving components. For instance, printers, scanners, photocopiers, fax machines, plotters, and other imaging systems often use optical encoding to track the movement of an image media, such as paper, as an image is printed on the media or an image is scanned from the media.

One common technique for optical encoding uses an optical sensor and an optical encoder pattern (or encoding media). The optical sensor focuses on a surface of the optical encoder pattern. As the sensor moves with respect to the optical encoder pattern (or encoding media), or the encoder pattern moves with respect to the optical sensor, the optical sensor reads a pattern of light either transmitted through, or reflected by, the optical encoder pattern to detect the motion.

A typical optical encoder pattern is an alternating series of light and dark elements. As the encoder and sensor move relative to the one another, transitions from one element to the next in the pattern are optically detected. For instance, an encoder pattern could be an alternating pattern of holes, or optically transmissive windows, in an opaque material. In that case, an optical sensor can detect transitions from darkness to light passing through the holes or windows.

FIG. 1 illustrates a basic optical encoder 100 comprising an optical unit 103 including an optical emitter 101 and an optical sensor 102, and a light controlling member (optical encoder pattern) 105 disposed between the optical emitter 101 and the optical sensor 102. Optical emitter 101 is a light source comprising, for example, one or more light emitting diodes. In general, optical sensor 102 comprises one or more photo-detectors, for example, photodiodes or charge coupled devices (CCDs). Optical unit 103 and optical encoder pattern 105 can move relative to each other in a linear fashion longitudinally of optical encoder pattern 105.

In one common application, optical unit 103 is mounted on the printing head of a printer, optical encoder pattern 105 is fixed to a case of the printer, and optical unit 103 moves along the length of encoder pattern 105 when the printing head moves. As optical unit 103 moves along the length of optical encoder pattern 105, light from optical emitter 101 passing through (or reflecting from) optical encoder pattern 105 is sensed by one or more photo-detectors of optical sensor 102 to produce one or more signals that indicate the relative movement between optical unit 103 and optical encoder pattern 105. The output signal or signals from optical sensor 102 are then used by the printer to help control the movement of the printing head and/or paper in the printing process.

FIGS. 2A-B illustrate the relationship between optical encoder pattern 105 formed on a code strip 210, a photo-detector 220 of optical sensor 102, and an output signal produced by photo-detector 220 when optical encoder pattern 105 and the optical unit 103 (including photo-detector 220) move relative to each other.

As seen in FIG. 2A, optical encoder pattern 105 is an alternating pattern of rectangular shaped "light" elements 230 and "dark" elements 240, and photo-detector 220 also has a rectangular shape. In many cases, the light elements 230 comprise light-transmitting regions, which may be transparent regions or apertures in the code strip 210, so that light from the optical emitter 101 passes through light elements 230 of code strip 210 to optical sensor 102, but is blocked by dark elements 240 from reaching optical sensor 102. In another alternative arrangement, light elements 230 comprise light-reflecting regions which may be white or shiny, so that light from optical emitter 101 reflects back from light elements 230 of code strip 210 to optical sensor 102, but light is absorbed by dark elements 240 and not reflected to optical sensor 102. The discussion to follow is equally applicable to each of these configurations.

Photo-detector 220 produces an output signal that depends upon the amount of light it receives from optical pattern 105. As optical encoder pattern 105 and optical unit 103 (including photo-detector 220) move relative to each other, the amount of light received by photo-detector 220 varies from virtually no light when photo-detector 220 is aligned with a dark element 240 of optical encoder pattern 105, to a maximum amount of light when photo-detector 220 is aligned with a light element 230 of optical pattern 105. Assuming that optical encoder pattern 105 and optical unit 103 move relative to each other at a constant rate, then FIG. 2B shows the output signal of photo-detector 220.

As can be seen in FIG. 2B, the output signal of photo-detector 220 is a trapezoidal-shaped signal, with a flat top, a flat bottom, and a constant slope between the top and bottom. The arrangement of FIGS. 2A-B pertains specifically to a linear code strip 210. In some cases, a circular code wheel is used in place of the code strip 210, in which case either the light elements 230 and dark elements 240, or the photo-detector 220, has a trapezoidal shape instead of the rectangular shape. In either case, the photo-detector 220 produces the trapezoidal-shaped output signal shown in FIG. 2B.

However, there are some disadvantages to the arrangement illustrated in FIGS. 2A-B. In particular, from a feedback or control system standpoint, the trapezoidal-shaped output signal of the photo-detector is not very desirable. During the "flat spots" as the top and bottom, the photo-detector is not outputting any useful information regarding the relative movement between the optical sensor and the optical encoder pattern. Furthermore, the trapezoidal-shaped output signal is actually a series of ramp functions, and it is well known that a ramp function is not differentiable. So acceleration cannot be obtained. From a feedback or control system standpoint, it would be preferable if the output signal of the photo-detector was instead generally sinusoidal in nature.

What is needed, therefore, is an optical encoder whose photo-detector(s) produce a generally sinusoidal output signal in response to relative movement between the optical encoder pattern and the optical sensor.

SUMMARY

In an example embodiment, an optical encoder comprises: an optical encoder pattern comprising an alternating pattern of light elements and dark elements; and an optical unit, comprising, an optical emitter providing light to the encoder pattern, and an optical sensor including a photo-detector receiving the light from the optical encoder pattern and in response thereto outputting a sinusoidal signal indicating relative movement between the optical sensor and the encoder pattern, wherein the photo-detector has one of a diamond shape and a modified diamond shape.

In another example embodiment, an optical encoder comprises: an optical encoder pattern comprising an alternating pattern of light elements and dark elements; and an optical unit, comprising, an optical emitter providing light to the encoder pattern, and an optical sensor including a photodetector receiving the light from the optical encoder pattern and in response thereto outputting a sinusoidal signal indicating relative movement between the optical sensor and the encoder pattern, wherein at least one of the light elements and the dark elements has one of a diamond shape, a modified diamond shape, and an hourglass shape.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 3 illustrates several examples of a diamond shape;

FIG. 4 illustrates several examples of a modified diamond shape;

FIG. 5 illustrates several examples of an hourglass shape;

DETAILED DESCRIPTION

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Furthermore, as used herein, the term "diamond shape" refers to the shape of a rhombus having no right angles, example of which are shown in FIG. 3. Also as used herein, the term "modified diamond shape" refers to the shape of a hexagon having four longer sides ("A sides") all having substantially the same length (A) and pairs of which connect together to form obtuse angles, and two shorter sides ("B sides") extending in parallel to each other and each having a length (B) that is shorter than the length A, each of the B sides being connected to a pair of the A sides to form acute angles. Examples of the modified diamond shape are shown in FIG. 4. The modified diamond shape may be obtained by taking the diamond shape and truncating each of the vertices of the two acute angles of the diamond shape with a straight line that is substantially parallel to a line passing between the two remaining obtuse vertices of the diamond shape. Also, as used herein the term "hourglass shape" refers to the shape of a hexagon having four sides ("A sides") all having substantially the same length (A) and pairs of which connect together to form reflex angles, and two sides ("B sides) extending in parallel to each other and each having a same length (B), each of the B sides being connected to a pair of the A sides to form acute angles. Examples of the hourglass shape are shown in FIG. 5. It will be understood that in actual practice ideal shapes cannot be created—for example, angles are generally rounded rather than perfectly sharp, sides are not exactly the same length, etc. Such equivalents of course fall within the scope of meaning of the terms defined above.

Figure 6A:
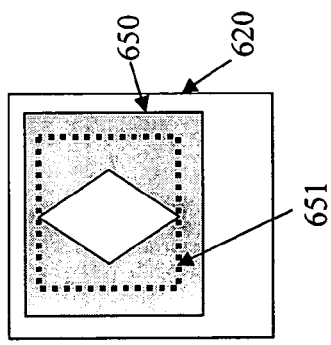
FIGS. 6A-B illustrate elements of an optical encoder including a reticle disposed on a photo-detector.
Figure 6B:
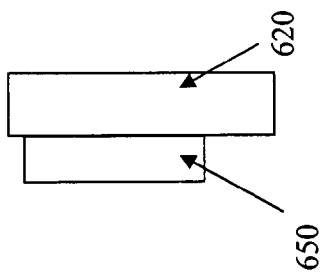

FIGS. 6A-B shows pertinent parts of an optical sensor 602 that will be used to illustrate one or more principles helpful to an understanding of the embodiments of the present invention to be explained below. Optical sensor 602 includes a reticle 650 disposed on a photo-detector 620. As can be seen in FIG. 6A, the photo-detector 620 includes a rectangular-shaped photosensitive area 651, while the reticle 650 has a diamond-shaped opening therein for light from an optical encoder pattern to be provided to the photo-detector 620.

Figure 6C:
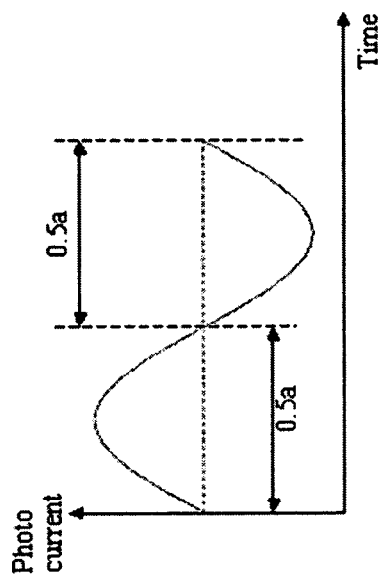
FIG. 6C illustrates an output signal produced by the photo-detector when the optical encoder pattern and an optical unit including the photo-detector of FIGS. 6A-B move relative to each other.

FIG. 6C illustrates an output signal produced by the photo-detector 620 when the optical sensor 602 operates in an optical encoder where the optical sensor 602 moves relative to an optical encoder pattern. As can be seen from FIG. 6C, the output signal of photo-detector 602 is a sinusoidal-shaped signal. As explained before, such a sinusoidal-shaped output signal is desirable.

Figure 1:
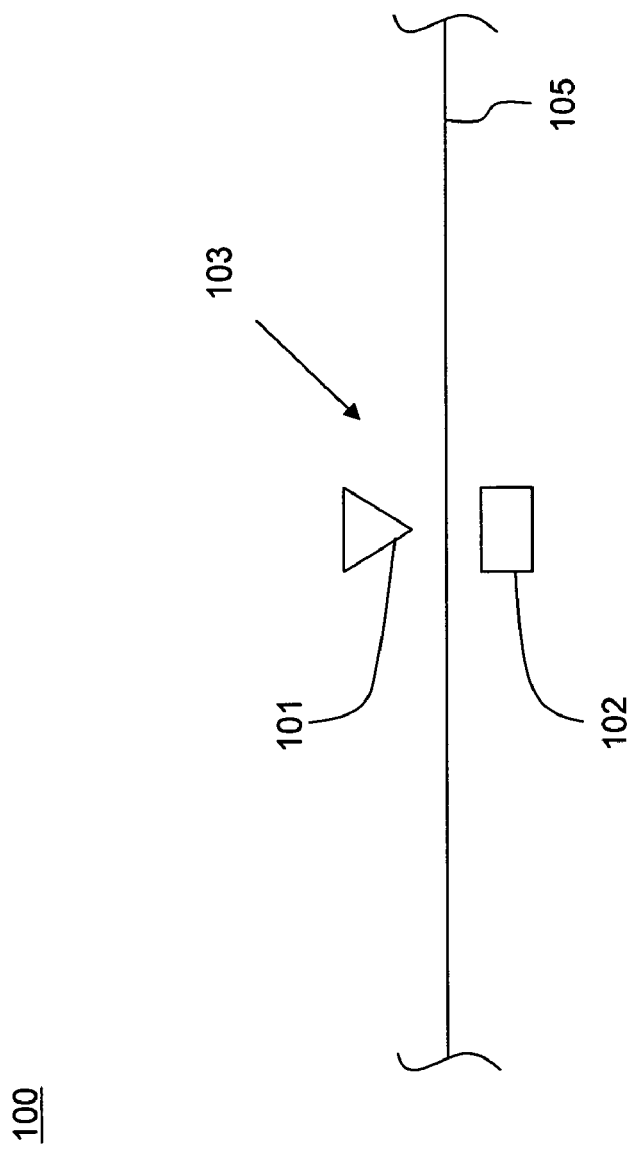
FIG. 1 shows a basic optical encoder.
Figures 2A, 2B:
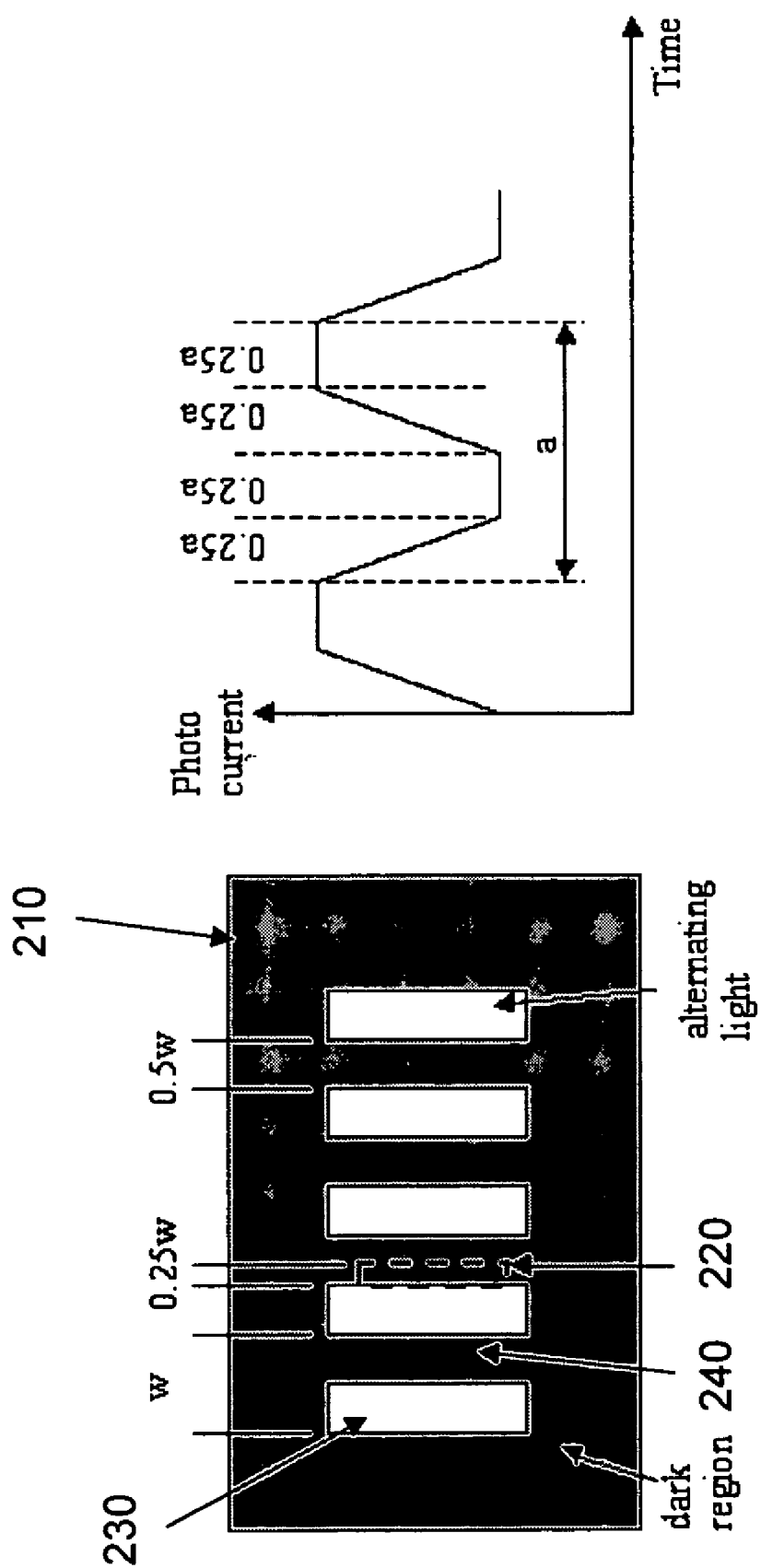
FIG. 2A illustrates elements of an optical encoder including an optical encoder pattern and a photo-detector.
FIG. 2B illustrates an output signal produced by the photo-detector when the optical encoder pattern and an optical unit including the photo-detector of FIG. 2A move relative to each other.

However, the optical sensor 602 of FIG. 6A-B suffers from disadvantages. In particular, it requires an extra component, namely the reticle 650, compared to a typical optical sensor used in a typical existing optical encoder of FIG. 1. This requires the complete replacement of any existing optical encoder, and the cost of the optical encoder with the reticle is of course higher than the cots of a similar device with no reticle. Also, adding the reticle requires design and fabrication changes to the existing packaging used for optical encoders, also entailing additional engineering costs.

Figure 7:
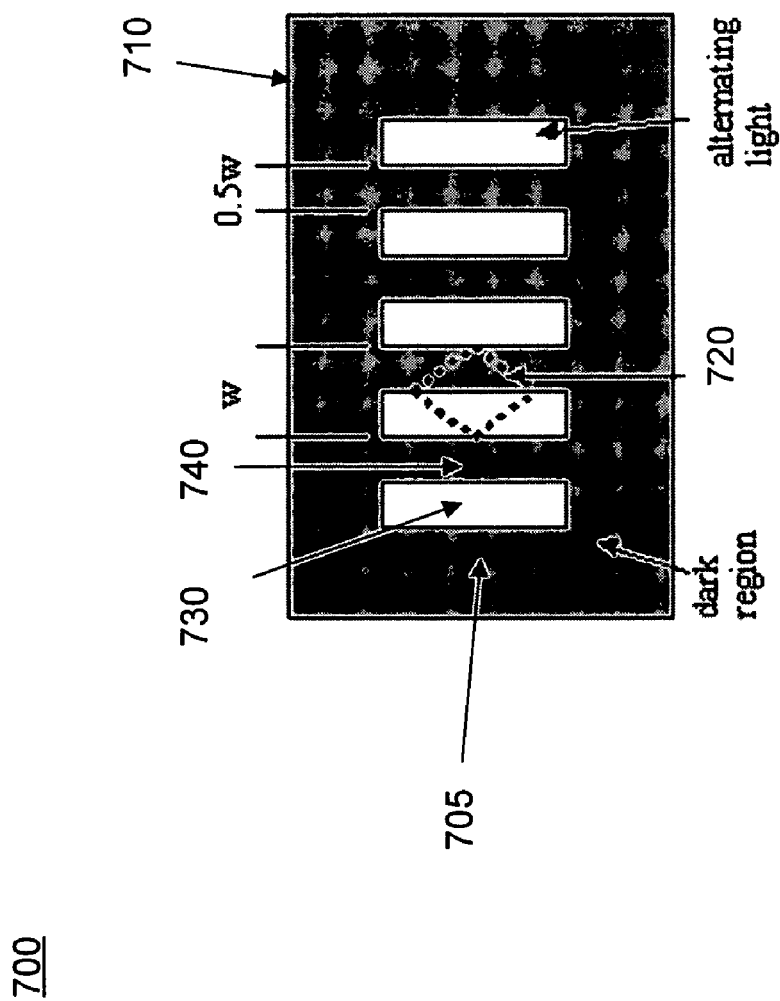
FIG. 7 illustrates elements of an optical encoder including a diamond-shaped photo-detector.
Figure 8B:
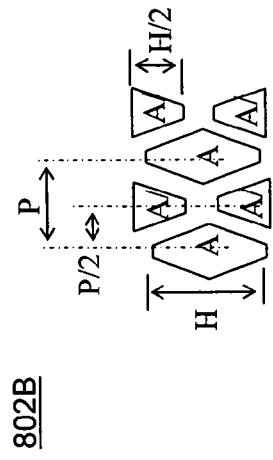
FIGS. 8A-D show various diamond-shaped photo-detector arrangements for one, two, and three-channel optical encoders.
Figure 8D:
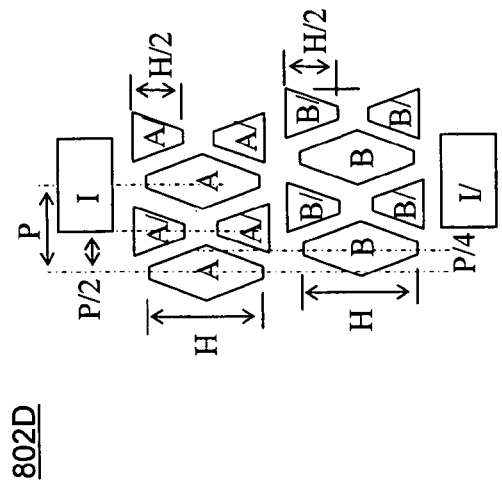
Figure 8A:
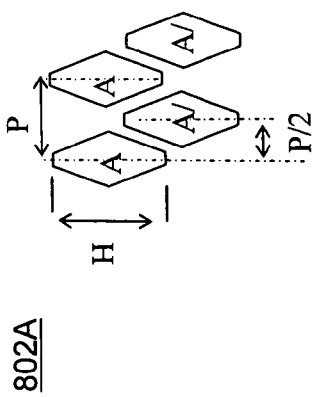
Figure 8C:
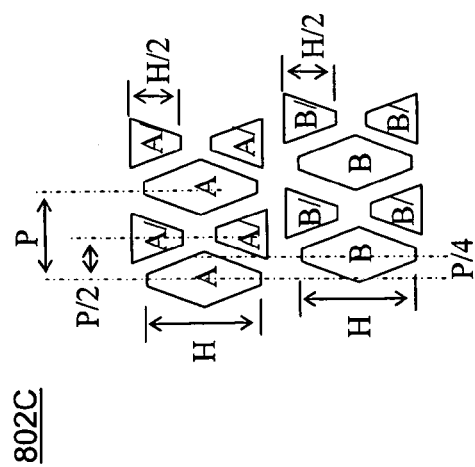

Accordingly, FIG. 7 shows pertinent parts of an optical encoder 700 that can produce a sinusoidal output signal while obviating some of the disadvantages of the arrangement of FIGS. 6A-B discussed above. Optical encoder 700 includes an optical unit (see FIG. 1) and an optical encoder pattern 705 on a code strip 710. The optical unit includes an optical emitter and an optical sensor. The optical emitter may be the same as the optical encoder 101 of FIG. 1, while the optical sensor includes diamond-shaped photo-detector 720. In an alternative embodiment, photo-detector 720 has the shape of a modified diamond. Optical encoder pattern 705 is an alternating pattern of rectangular shaped light elements 730 and dark elements 740.

In many cases, the light elements 730 comprise light-transmitting regions, which may be transparent regions or apertures in code strip 710, so that light from the optical emitter passes through light elements 730 of code strip 710 to the optical sensor, but is blocked by dark elements 740 from reaching optical sensor. In another alternative arrangement, light elements 730 comprise light-reflecting regions which may be white or shiny, so that light from the optical emitter reflects back from light elements 730 of code strip 710 to the optical sensor, but light is absorbed by dark elements 740 and not reflected to the optical sensor. The discussion to follow is equally applicable to each of these configurations.

Photo-detector 720 produces an output signal that depends upon the amount of light it receives from optical pattern 705. As optical pattern 705 and the optical unit (including photo-detector 720) move relative to each other, the amount of light received by photo-detector 720 varies from very little light when photo-detector 720 is aligned with a dark element 740 of optical pattern 705, to a maximum amount of light when photo-detector 720 is aligned with a light element 730 of optical encoder pattern 705. Assuming that optical encoder pattern 705 and optical unit 703 move relative to each other at a constant rate, then the output signal of photo-detector 720 is the same as that shown in FIG. 6C. As can be seen in FIG. 6C, the output signal of photo-detector 720 is a sinusoidal-shaped signal.

FIGS. 8A-D show various diamond-shaped photo-detector arrangements for optical sensors 802A, 802B, 802C and 802D for one, two, and three-channel optical encoders. Each of optical sensors 802A, 802B, 802C and 802D includes several modified-diamond-shaped photo-detectors 720. As can be seen in FIGS. 7 & 8A-D, in each of the optical sensors 802A, 802B, 802C and 802D, the pitch of photo-detectors 720 aligned in a same row is the same as the pitch of light elements 730 of code strip 710 (p=w).

Although the embodiments illustrated above with respect to FIGS. 7 and 8A-D pertain specifically to the case where a linear code strip is employed, in some cases a circular code wheel is used in place of code strip 710, in which case light elements 730 and dark elements 740 have a trapezoidal shape, instead of the rectangular shape, so that photo-detector 720 produces the sinusoidal-shaped output signal shown in FIG. 6C.

The arrangements of FIGS. 7 and 8A-D have the advantage compared to the arrangement of FIGS. 6A-B in that no separate reticle is required, and they do not require design and fabrication changes to existing packaging used for optical encoders.

In an alternative arrangement, rather than providing a progression of rectangular-shaped light beams from an optical encoder pattern onto a diamond-shaped photo-detector, instead one or more diamond-shaped (or modified-diamond-shaped, or hourglass shaped) openings are provided in an optical encoder pattern on a code strip or code wheel in order to provide diamond shaped (or modified diamond shaped, or hourglass shaped) light onto a rectangle-shaped photo-detector.

Figure 9:
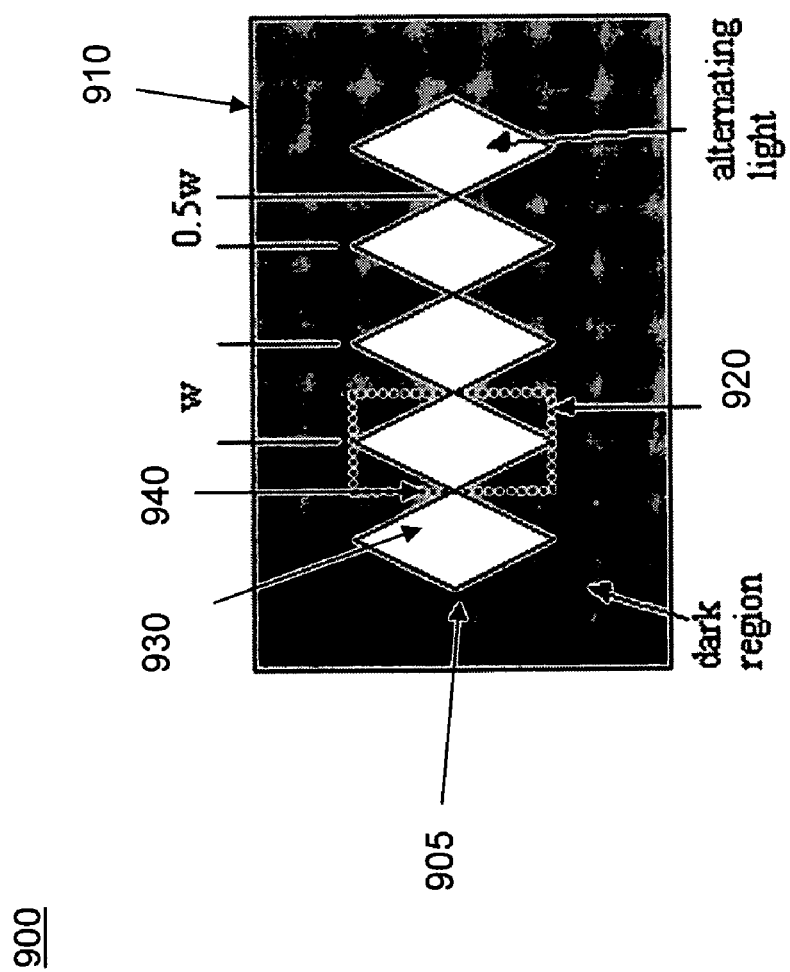
FIG. 9 illustrates elements of an optical encoder including a diamond-shaped optical encoder pattern element.

Accordingly, FIG. 9 shows pertinent parts of another optical encoder 900 that can produce a sinusoidal output signal. Optical encoder 900 includes an optical unit (see FIG. 1) and an optical encoder pattern 905 on a code strip 910. The optical unit includes an optical emitter and an optical sensor. The optical emitter may be the same as the optical encoder 101 of FIG. 1. Optical sensor includes one or more rectangular-shaped photo-detectors 920. Optical encoder pattern 905 is an alternating pattern of modified-diamond-shaped light elements 930 and hourglass-shaped dark elements 940. In alternative embodiments, light elements 930 have a diamond shape or an hourglass shape.

In many cases, light elements 930 comprise light-transmitting regions, which may be transparent regions or apertures in code strip 910, so that light from the optical emitter passes through light elements 930 of code strip 910 to the optical sensor, but is blocked by dark elements 940 from reaching the optical sensor. In another alternative arrangement, light elements 930 comprise light-reflecting regions which may be white or shiny, so that light from the optical emitter reflects back from light elements 930 of code strip 910 to the optical sensor, but light is absorbed by dark elements 940 and not reflected to the optical sensor. The discussion to follow is equally applicable to each of these configurations.

Photo-detector 920 produces an output signal that depends upon the amount of light it receives from optical encoder pattern 905. As optical encoder pattern 905 and optical unit (including photo-detector 920) move relative to each other, the amount of light received by photo-detector 920 varies from very little light when photo-detector 920 is aligned with a dark element 940 of optical encoder pattern 905, to a maximum amount of light when photo-detector 920 is aligned with a light element 930 of optical encoder pattern 905. Assuming that optical encoder pattern 905 and the optical unit move relative to each other at a constant rate, then the output signal of photo-detector 920 is the same as that shown in FIG. 6C. As can be seen in FIG. 6C, the output signal of photo-detector 920 is a sinusoidal-shaped signal.

Figure 10A:
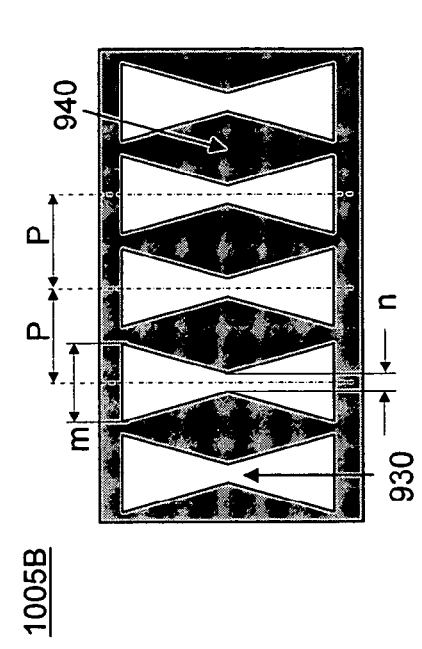
FIGS. 10A-D illustrate encoder patterns for a code strip where the light and dark elements have various shapes.
Figure 10B:
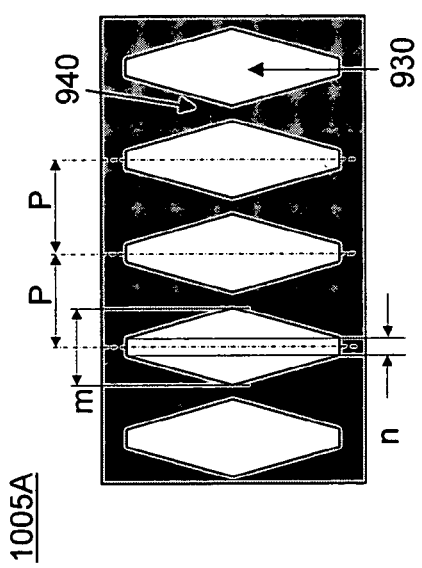
Figure 10C:
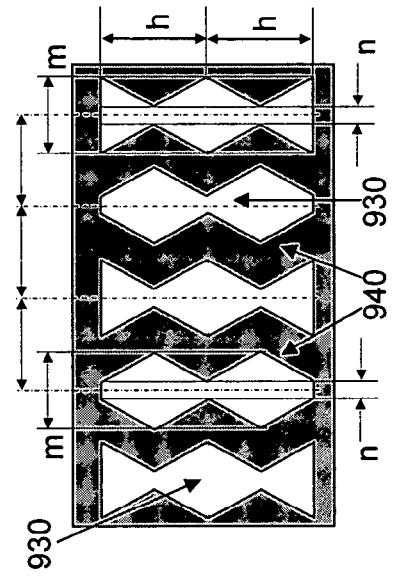
Figure 10D:
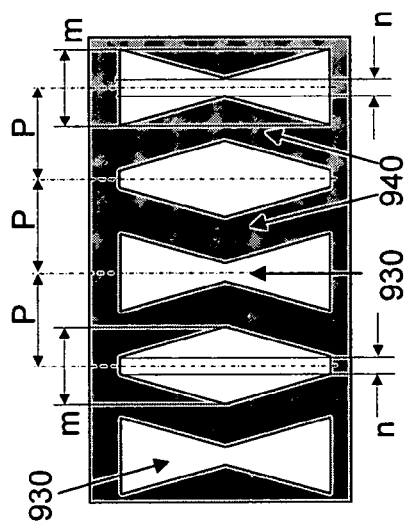

FIGS. 10A-D illustrate optical encoder patterns 1005A, 1005B, 1005C and 1005D for a code strip 910 where the light and dark elements 930, 940 are diamond-shaped (or modified-diamond-shaped, or hourglass-shaped). Each of optical encoder patterns 1005A, 1005B, 1005C and 1005D includes several light elements 930 having a diamond shape, a modified diamond shape, and/or an hourglass shape. In particular, in FIG. 10A the light elements 930 have a modified-diamond shape, while dark elements 940 have an hourglass shape. In FIG. 10B the light elements 930 have an hourglass shape, while dark elements 940 have a modified-diamond shape. In FIG. 10C the optical encoder pattern 1005C includes an alternating pattern of modified-diamond-shaped light elements 930 and hourglass-shaped light elements 930, and an alternating pattern of hourglass-shaped dark elements 940 and modified-diamond-shaped dark elements 940. In FIG. 10D the light elements 930 all have a modified-diamond shape. In optical encoder patterns 1005A-1005C of FIGS. 10A-C, the code strip track height=1 h, while in optical encoder pattern 1005D of FIG. 10D the code strip track height=2 h, where H/h is in integer value, where H is the height of the photo-detector 920, and h is the height of one diamond, modified diamond, or hourglass shape.

As can be seen in FIGS. 10A-D, in each of the optical encoder patterns 1005A, 1005B, 1005C and 1005D, the pitch of light elements 930 is the same as the pitch of photo-detectors 920 of code strip 910. Also, a ratio of a width of each of the light elements 930 at their widest portion, to a pitch between adjacent light elements 930, is about 0.84. Furthermore, a ratio of a width of each of the light elements 930 at their narrowest portion, to a pitch between adjacent light elements 930, is about 0.16.

Although the embodiments illustrated above with respect to FIGS. 9 and 10A-D pertain specifically to the case where a linear code strip is employed, in some cases a circular code wheel is used in place of code strip 910, in which case the photo-detector 920 has a trapezoidal shape, instead of the rectangular shape, so that photo-detector 920 produces the sinusoidal-shaped output signal shown in FIG. 6C.

Figure 11B:
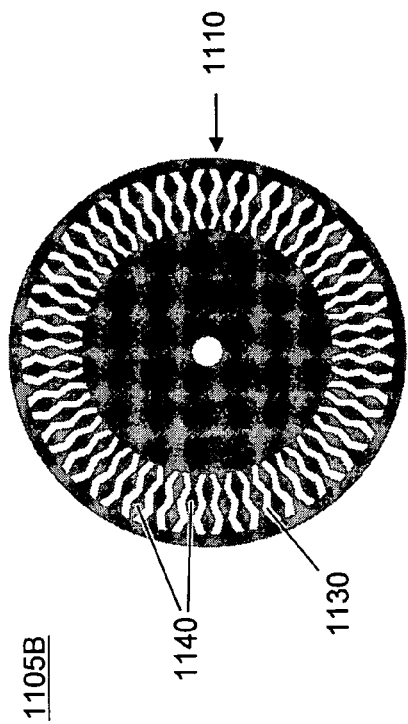
FIGS. 11A-D illustrate encoder patterns for a code wheel where the light and dark elements have various shapes.
Figure 11D:
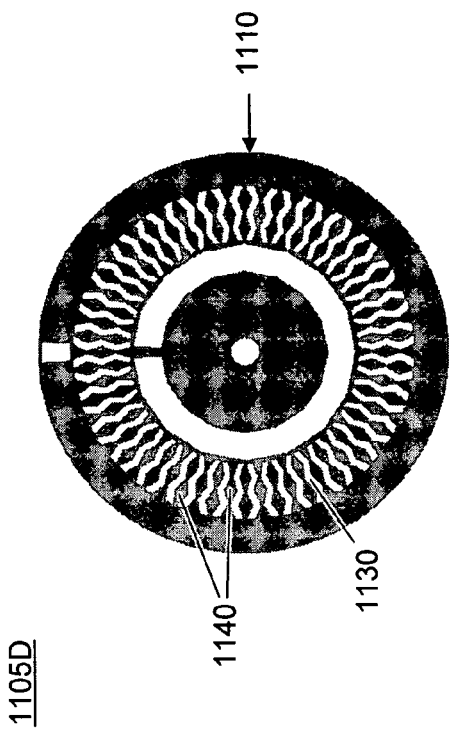
Figure 11A:
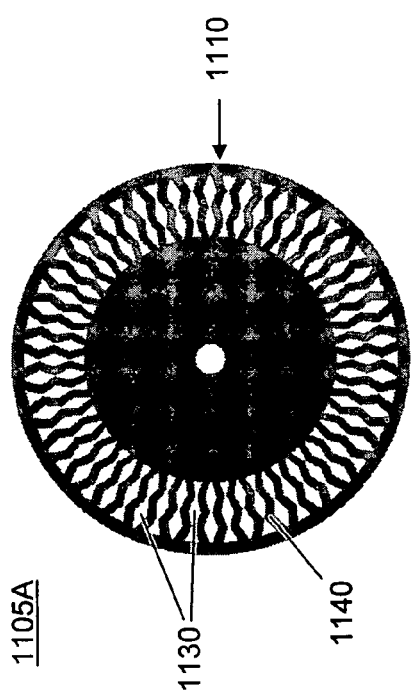
Figure 11C:
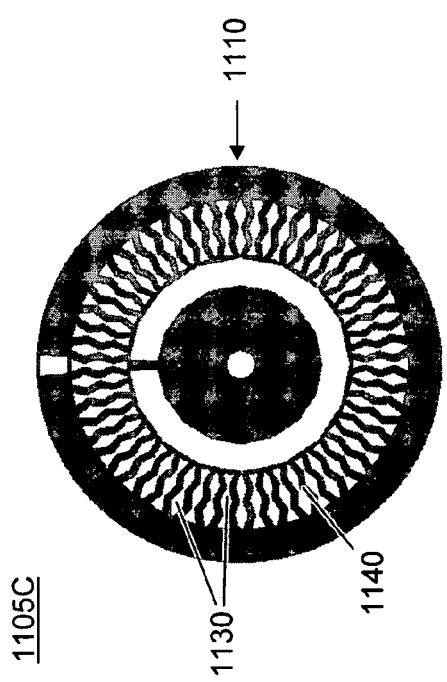

FIGS. 11A-D illustrate encoder patterns for a code wheel 1110 where the light and dark elements 1130, 1140 are diamond shaped (or modified diamond shaped, or hourglass shaped). Each of optical encoder patterns 1105A, 1105B, 1105C and 1105D includes several light elements 1130 having a modified diamond shape. In particular, in FIG. 11A the light elements 1130 have a modified-diamond shape, while in FIG. 11B the dark elements 1140 have a modified-diamond shape. FIGS. 11C and 11D show the optical encoder patterns 1105C and 1105D having the same patterns as optical encoder patterns 1105A and 1105B, respectively, except that FIGS. 11C and 11D pertain to a three-channel code wheel having a separate index channel for generating an index position signal. In optical encoder patterns 1105A-1105D of FIGS. 11A-D, the code strip track height=2 h, where H/h is in integer value, where H is the height of the photo-detector 920, and h is the height of one diamond, modified diamond or hourglass shape.

The arrangements of FIGS. 9-11D have the advantage compared to the arrangement of FIGS. 6A-B in that no separate reticle is required, and they do not require design and fabrication changes to existing packaging used for optical encoders. Furthermore, in many cases existing optical encoders in the field can be easily retrofit with a new code strip or code wheel as described above to produce the desired sinusoidal-shaped output signal.

According to the embodiments described above wherein either the light sensitive area of the photo-detector has a diamond (or modified-diamond) shape, or at least one of the light and dark elements of the optical encoder pattern have a diamond shape (or modified-diamond shape, or hourglass shape), the photo-detector outputs a sinusoidal signal without adding a reticle or other additional component to the optical encoder, or requiring any changes to the packaging of the optical encoder. Meanwhile, from a feedback or control system standpoint, the sinusoidal output signal of the photo-detector is very desirable.

While example embodiments are disclosed herein, one of ordinary skill in the art appreciates that many variations that are in accordance with the present teachings are possible and remain within the scope of the appended claims. The embodiments therefore are not to be restricted except within the scope of the appended claims.

The invention claimed is:

1. An optical encoder, comprising:
   an optical encoder pattern comprising an alternating pattern of light elements and dark elements; and
   an optical unit, comprising,
      an optical emitter providing light to the encoder pattern, and
      an optical sensor including a photo-detector receiving the light from the optical encoder pattern and in response thereto outputting a sinusoidal signal indicating relative movement between the optical sensor and the encoder pattern,
   wherein the photo-detector has one of a diamond shape, a modified diamond shape, and an hourglass shape.

2. The optical encoder of claim 1, further comprising a code strip, wherein the optical encoder pattern is provided on the code strip and wherein the light elements and dark elements of the optical encoder pattern each have a rectangular shape.

3. The optical encoder of claim 1, further comprising a code wheel, wherein the optical encoder pattern is provided on the code wheel and wherein the light elements and dark elements of the optical encoder pattern each have a trapezoidal shape.

4. The optical encoder of claim 1, wherein the optical sensor further comprises a second photo-detector having one of a diamond shape, a modified diamond shape, and an hourglass shape.

5. An optical encoder, comprising:
   an optical encoder pattern comprising an alternating pattern of light elements and dark elements; and
   an optical unit, comprising,
      an optical emitter providing light to the encoder pattern, and
      an optical sensor including a photo-detector receiving the light from the optical encoder pattern and in response thereto outputting a sinusoidal signal indicating relative movement between the optical sensor and the encoder pattern,
   wherein at least one of the light elements and the dark elements has one of a diamond shape, a modified diamond shape, and an hourglass shape.

6. The optical encoder of claim 5, further comprising a code strip, wherein the optical encoder pattern is provided on the code strip, and wherein the photo-detector has a rectangular shape.

7. The optical encoder of claim 5, further comprising a code wheel, wherein the optical encoder pattern is provided on the code wheel, and wherein the photo-detector has a trapezoid shape.

8. The optical encoder of claim 5, wherein a ratio of a width of each of the light elements at their widest portion, to a pitch between adjacent light elements, is about 0.84.

9. The optical encoder of claim 5, wherein a ratio of a width of each of the light elements at their narrowest portion, to a pitch between adjacent light elements, is about 0.16.

10. The optical encoder of claim 5, wherein at least one of the light elements has the hourglass shape.

11. The optical encoder of claim 5, wherein the light elements comprise an alternating pattern of elements having the modified diamond shape and the hourglass shape.

12. The optical encoder of claim 5, wherein the at least one of the light elements and the dark elements has an hourglass shape.

13. The optical encoder of claim 5, wherein the at least one of the light elements and the dark elements has a diamond shape.

14. The optical encoder of claim 5, wherein the at least one of the light elements and the dark elements has a modified diamond shape.

15. An optical encoder, comprising:
   an optical encoder pattern comprising an alternating pattern of light elements and dark elements; and
   an optical unit, comprising,
      an optical emitter providing light to the encoder pattern, and
      an optical sensor including a photo-detector receiving the light from the optical encoder pattern and in response thereto outputting a sinusoidal signal indicating relative movement between the optical sensor and the encoder pattern,
   wherein at least one selected from the group consisting of the photo-detector, one of the light elements, and one of the dark elements, has one of a diamond shape, a modified diamond shape, and an hourglass shape.

16. The optical encoder of claim 15, wherein the at least one of the light elements and the dark elements has an hourglass shape.

17. The optical encoder of claim 15, wherein the at least one of the light elements and the dark elements has a diamond shape.

18. The optical encoder of claim 15, wherein the at least one of the light elements and the dark elements has a modified diamond shape.

19. The optical encoder of claim 15, wherein the light elements comprise an alternating pattern of elements having the modified diamond shape and the hourglass shape.

* * * * *